June 7, 1966 E. M. MARWELL ETAL 3,255,413
ELECTRO-CHEMICAL COULOMETER INCLUDING DIFFERENTIAL CAPACITOR
MEASURING ELEMENTS
Filed May 24, 1962 2 Sheets-Sheet 1
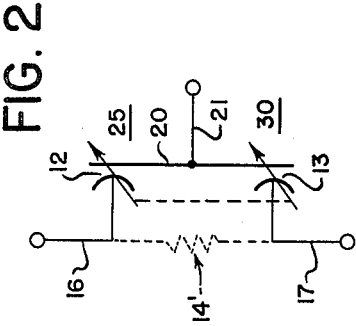
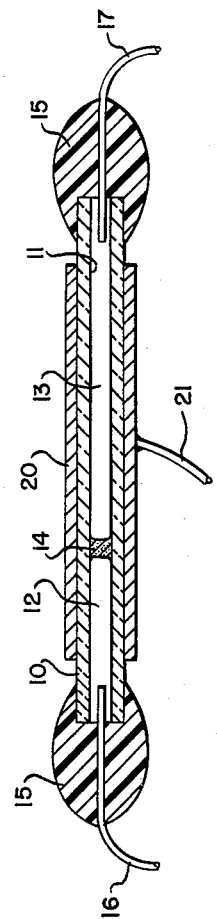
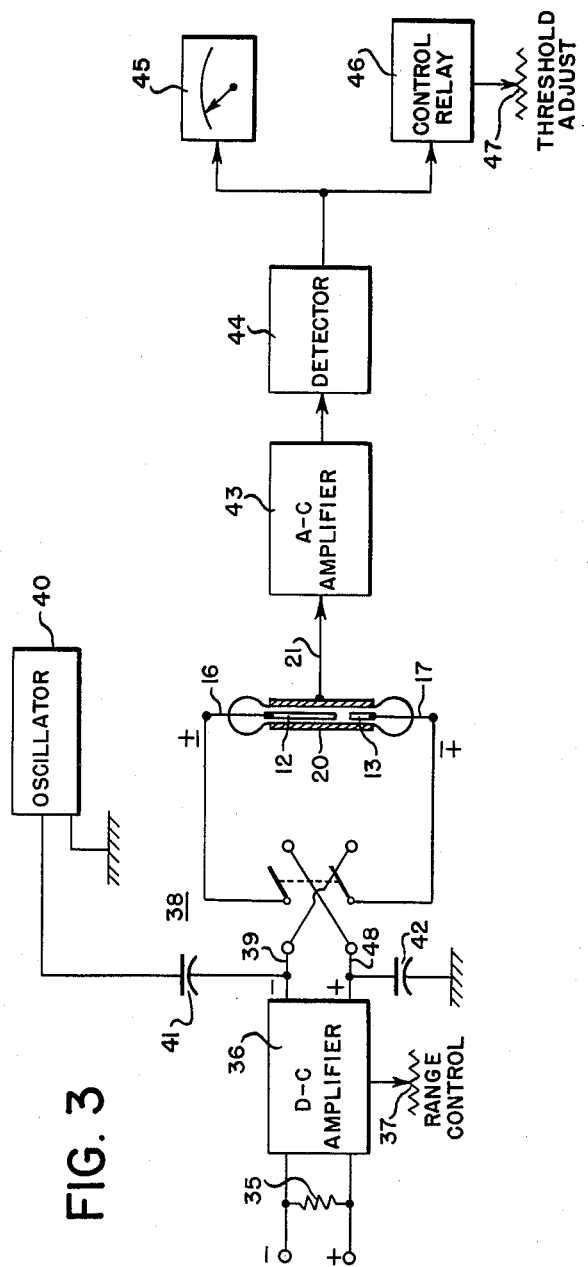
INVENTORS
EDWARD M. MARWELL
CURTIS C. BEUSMAN
BY Pennie, Edmonds,
Morton, Barrows and Taylor
ATTORNEYS

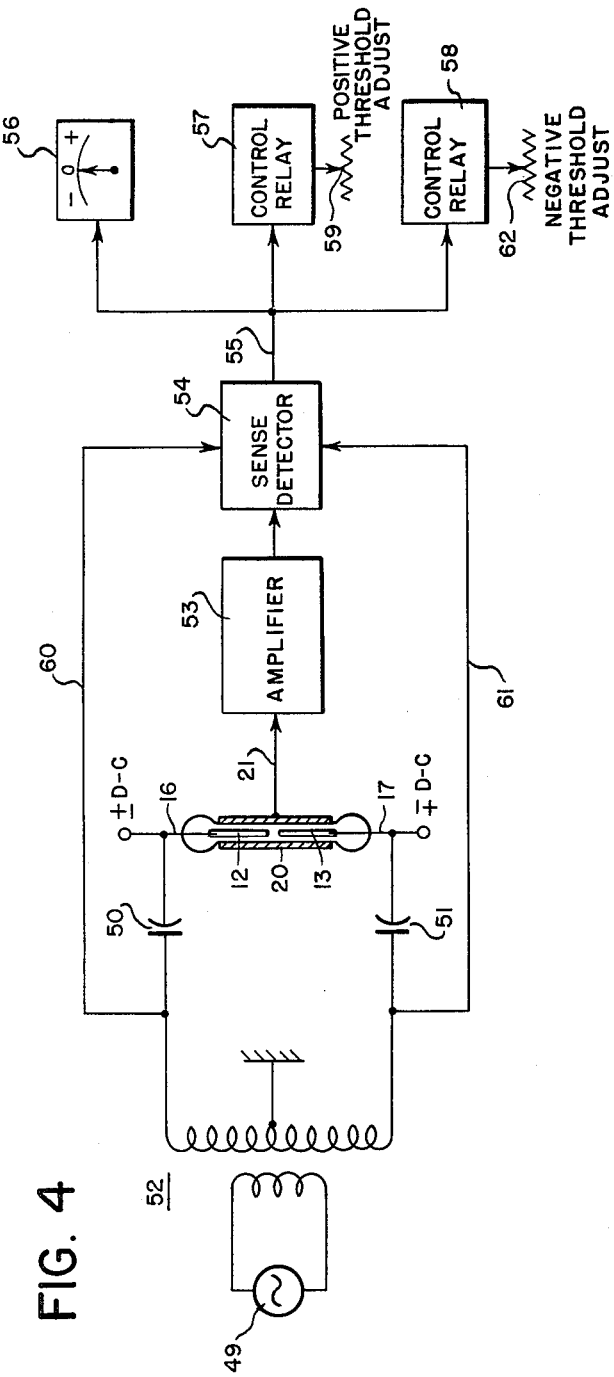
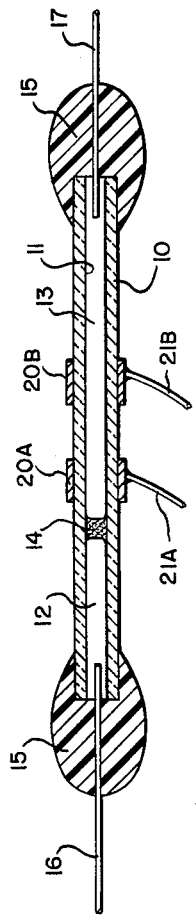

3,255,413
ELECTRO-CHEMICAL COULOMETER INCLUDING DIFFERENTIAL CAPACITOR MEASURING ELEMENTS
Edward M. Marwell and Curtis C. Beusman, Mount Kisco, N.Y., assignors to Curtis Instruments, Inc., Mount Kisco, N.Y., a corporation of New York
Filed May 24, 1962, Ser. No. 197,429
5 Claims. (Cl. 324—94)

The present invention relates to electrochemical devices known as coulometers and more specifically to a coulometer type instrument which is capable of measuring and indicating the total electrical current that has been conducted through an electrical circuit.

The present invention is an improvement over the apparatus described in U.S. Patent No. 3,045,178 filed September 15, 1958 by Lester Corrsin and entitled "Operating Time Indicator."

The instrument described therein includes a tubular body of nonconductive material having a bore therethrough which supports two columns of liquid metal (e.g., mercury), the adjacent innermost ends of which are separated by but maintained in conductive contact with a small volume of electrolyte. The outermost ends of the liquid metal columns are maintained in contact with suitable conductive leads provided to connect the instrument to a source of electrical current to be measured. The flow of electrical current from one metal column to the other through the electrolyte causes metallic ions to migrate from the positive column (anode) to the negative column (cathode). In accordance with Faraday's Law, liquid metal is electroplated from the anode column to the cathode column causing the anode to decrease in length and the cathode to proportionately elongate, the change in column length being directly proportional to the total electrical charge passed through the device.

With the instrument of the above identified application, readout of the measured time (or time-current product) is effected by direct visual comparison of one column length against a calibrated scale.

An object of the present invention is to provide an improved coulometer type instrument which affords electrical readout of the measured time or time-current product.

According to the present invention, a coulometric instrument of the type generally described above is provided wherein the outer wall of the nonconductive body of the instrument is coated with an electrically conductive material. The resultant conductive sheath functions in combination with the variable length liquid-metal columns as a capacitive potentiometer, the capacitance value between either column and the outer sheath varying directly as a function of column length.

In a preferred embodiment of the invention, electrical readout of the column lengths is effected by electrically energizing the two columns with a relatively high-frequency A.-C. voltage (e.g., 80 kc.) and measuring the amplitude of the A.-C. voltage developed between the outer sheath and a desired reference, e.g., chassis ground. In one embodiment of the invention, one of the columns is maintained at A.-C. ground potential and the voltage developed on the sheath is amplified, detected and the amplitude is measured as an indication of column length and hence as a direct indication of total D.-C. current flow through the instrument.

In a second embodiment of the invention, the two columns of the instrument are electrically energized by a balanced or push-pull high-frequency A.-C. voltage and the voltage developed on the sheath is amplified and then detected by a phase-sensitive detector. The signal amplitude from the detector is zero when the column lengths are equal, a positive voltage when one column is longer and a negative voltage when the second volumn is longer. Thus this embodiment of the invention has direction sense and is capable of measuring and indicating the magnitude of total current flow through the instrument as well as the direction of current flow therethrough. The null and direction sensing capability of this embodiment is particularly useful in electrical servo-control systems and the like where it is necessary to sense and correct variable long-term D.-C. error signals.

The electrical readout feature of the present invention affords an attractive operational feature in that the indicator devices may be located remotely from the coulometer, or the instrument signals may be recorded or used as control information for automatic control systems and the like.

A full description of illustrative embodiments of the present invention is given below. In the course of the description reference is made to the accompanying drawings in which:

FIG. 1 is a sectional view of the improved coulometric instrument provided by the present invention;

FIG. 2 is a schematic diagram illustrating the equivalent electrical circuit of the instrument shown in FIG. 1;

FIG. 3 is a simplified block and schematic diagram of an unbalanced electrical readout circuit for the instrument shown in FIG. 1; and FIG. 4 is a simplified block and schematic diagram of a balanced direction-sensitive readout circuit for the instrument shown in FIG. 1.

FIG. 5 is a sectional view of a variation of the coulometric instrument shown in FIG. 1.

In FIG. 1 there is shown at 10 a tube of nonconductive material such as glass, ceramic, epoxy resin or the like having a capillary bore 11 extending from end to end through the central portion of the tube as shown. Two liquid metal columns 12 and 13 (e.g., mercury) are placed in the bore extending inwardly from opposite ends of the tube and separated at the innermost ends by a small volume of electrolyte 14 which is maintained in conductive contact with both columns. A suitable electrolyte may comprise a water solution of potassium iodide and mercuric iodide as described in the above identified patent.

The bore 11 is sealed at both ends by epoxy resin seals 15 as illustrated. Electrical contact with the respective liquid metal columns is provided by conductive leads 16 and 17, the innermost ends of which are immersed in the mercury columns. The conductive leads are preferably made of a metal such as nickel, which does not chemically combine with mercury.

As shown, a conductive sheath 20 is secured to the outer surface of 10 along substantially the full length thereof and an electrically conductive lead 21 is attached to the sheath 20 to permit electrical connection thereto. Conductive epoxy resin has been found to be very satisfactory for this purpose, however, it is understood that any suitable electrical conductor disposed around the exterior surface of the body may be used as an alternative.

A schematic diagram of the equivalent electrical circuit for the instrument of FIG. 1 is illustrated in FIG. 2. The capacitance between column 12 and sheath 20 and between column 13 and sheath 20 is represented by a variable differential capacitor comprising variable capacitors 25 and 30 with sheath 20 functioning as a common stator plate. The capacitor rotors, represented by columns 12 and 13, are shown as being mechanically ganged together since the lengths of the respective columns change differentially and concomitantly. Thus when the capacitance value of 25 increases, the capacitance value of 30 decreases and vice versa. The effective electrical resistance of the electrolyte 14 is shown at 14' connected in shunt with capacitors 25 and 30.

Practical operating instruments have been constructed having an outer conductive sheath one inch long, an outside body diameter of 0.042 inch, and an inside diameter of 0.015 inch. The maximum capacitance between one column and the sheath for this instrument is ten micromicrofarads. The maximum capacitance of an instrument having the same dimensions as above but with an outside diameter of 0.025 inch is twenty micromicrofarads.

It will be recognized that the coulometer instrument provided by this invention electrically functions as a capacitative potentiometer which then electrically energized with A.-C. voltage divides the voltage as a linear function of either column length.

A preferred embodiment of the invention utilizing the improved instrument in FIG. 1 and featuring remote electrical readout of the measured time-integrated current is shown in FIG. 3. A small D.-C. voltage developed by flow of D.-C. current (a portion of the current to be measured) through shunt 35 is amplified by a stable D.-C. amplifier 36, the gain or gain range of which can be suitably varied by control 37. The output signal from 36 is connected to leads 16 and 17 of the coulometer through the double-pole, double-throw reversing switch 38, the latter permitting quick reversal of the direction of D.-C. current flow through the coulometer when one mercury column has been substantially electroplated onto the other.

The internal impedance of amplifier 36 is preferably made high so that it appears as a constant current source to the coulometer. Consequently, slight variations in electrolyte resistance with interchange of coulometers has substantially no effect on instrument measuring accuracy.

A relatively high frequency A.-C. voltage (e.g., 80 kc.) is supplied by oscillator 40, which is preferably a constant voltage generator, via blocking capacitor 41 to lead 39 which is in turn connected to either 16 or 17 in accordance with the left or right setting of reversing switch 38. Output lead 48 is maintained at A.-C. ground by capacitor 42 and hence one of the columns 16, 17 is also maintained at chassis ground.

The amplitude of the voltage developed on conductive sheath 20 varies directly as a function of the length of the ungrounded column. The voltage on 20 and 21 is amplified by A.-C. amplifier 43, which preferably has a high input impedance, rectified by envelope detector 44 and measured by meter 45 which may be calibrated to read directly in ampere-hours or in elapsed time as required. The variable amplitude D.-C. output signal from detector 44 may also be supplied to a control relay 46 having a variable operating threshold control 47. By adjusting 47 relay 46 may be set to operate at any desired detector output voltage corresponding to a predetermined time interval or ampere-hour value as determined by the length of the ungrounded column in the coulometer.

Switch contacts on relay 46 (not shown) may be utilized for a variety of purposes including the actuation of an alarm, automatic shutoff of electrical power, and the like. Reverse switch 38 may be actuated by relay 46 so that reversal of the D.-C. current flow through the coulometer is effected automatically after the length of either column 12 or column 13 has reached a predetermined maximum value. Automatic reversal of the meter to provide for long range current integrations is thus effected by repetitive recycling of the coulometer element.

In the balanced circuit arrangement shown in FIG. 4, a high-frequency A.-C. voltage of substantially constant amplitude is supplied in push-pull to leads 16 and 17 by oscillator 49 via transformer 52 and D.-C. blocking capacitors 50 and 51. The secondary centertap of transformer 52 is grounded as shown. For simplification purposes the reversing switch and D.-C. amplifier (shown in FIG. 3) have been omitted. With this circuit arrangement, a voltage is produced at 20, 21 by the separate current (180° out of phase) flowing between 12 and 20 and 13 and 20. When the lengths of 12 and 13 are equal (capacitances to 20 equal), the out-of-phase currents will cancel and no voltage will be produced between 21 and chassis ground. When the length of one column exceeds the other, an A.-C. voltage will be developed between 21 and ground, the amplitude of which will vary as a function of the difference in the values of capacitances between 13, 20 and 12, 20. It will be apparent that the A.-C. voltage developed on 21 will not only vary in amplitude on either side of the null, but the phase will differ by 180° on opposite sides of the balanced capacitance or null condition. Thus the variable amplitude voltage on 21 will either have a 0° phase when the column connected to that reference phase from the oscillator is the longer, or the voltage will have the inverted or 180° phase when the opposite column is the longer.

The signal voltage on 21 is amplified by A.-C. coupled amplifier 53, which preferably has a high input impedance, and the output signal from that amplifier is supplied to a phase-sensitive (sense) detector 54 which is also energized via leads 60, 61 by the push-pull A.-C. voltage from oscillator 49. The D.-C. output signal on varies in amplitude directly as a function of the signal amplitude on 21 and the sign or polarity changes with A.-C. signal phase. The signal on 55 is supplied to a zero-center reading meter 56 which may be calibrated to read plus ampere-hours on one side of the zero center and minus ampere-hours on the opposite side, the plus and minus polarities corresponding to predetermined directions of D.-C. current flow in the metered circuit.

The signal on 55 is also supplied to control relays 57 and 58 which are provided with separate means 59 and 62 to vary the respective operating thresholds. Relay 57 is operated when the positive amplitude of the D.-C. voltage on 55 equals or exceeds the operating threshold of 57, as determined by the setting of 59, and relay 58 is operated when the negative amplitude of the D.-C. voltage on 55 equals or exceeds the operating threshold of 58 as determined by the setting of 62.

A further variation of the improved coulometer described above is illustrated in FIG. 5 with like parts being identified by the same numerals as in FIG. 1. Here, separate conductive bands 20A and 20B with leads 21A and 21B respectively attached thereto are provided. The bands may be comprised of one or more turns of wire or may consist of conductive epoxy resin conveniently applied by brush around the outer surface at predetermined distances along the tubular body. This embodiment of the invention is particularly useful in applications where it is necessary to develop on-off control signals at predetermined integration levels rather than a linear continuous indication of the integration process. It will be apparent that further bands may be added as required in order to provide any desired number of pickoff capacitors for sensing specific column lengths corresponding to predetermined values of time (where measured D.-C. current is constant) or ampere-hours.

While the invention has been particularly shown and described with reference to preferred embodiments thereof, it will be understood by those skilled in the art that various changes in form and details may be made therein without departing from the spirit and scope of the invention.

We claim:

1. A variable-capacitance coulometer for electrically indicating the total electrical charge conducted through a circuit, said coulometer comprising a body of electrically non-conductive material having a bore of substantially uniform cross section therethrough, said bore having therein two columns of metal each of which extends from an end of the bore toward the other column such that a space not occupied by column metal exists between the adjacent ends of said columns, an electrolyte disposed in the space between the innermost ends of said columns and maintained in electrical contact with each of said columns, an electrically conductive coating surrounding at least a portion of the outer surface of said body to define dual differential capacitors, conductive means for connecting said columns to an external source of electrical current, and conductive means for connecting said electrically conductive coating to an external voltage-sensitive indicator, whereby, upon connecting said columns to an external current source, metal is removed from one of said columns and deposited on the other of said columns, the differential change of electrical capacitances between said columns and said coating being directly indicative of the total electrical charge conducted through the coulometer.

2. A variable-capacitance coulometer for electrically indicating discrete changes in the electrical charge conducted through a circuit, said coulometer comprising a body of electrically non-conductive material having a bore of substantially uniform cross section therethrough, said bore having therein two columns of metal each of which extends from an end of the bore toward the other column such that a space not occupied by column metal exists between the adjacent ends of said columns, an electrolyte disposed in space between the innermost ends of said columns and maintained in electrical contact with each of said columns, a plurality of electrical conductors disposed around the outer surface of said body provided to function cooperatively with at least one of said columns to form capacitors which vary in value as the metal columns change in length, and conductive means for connecting said columns to an external source of electrical current.

3. Apparatus for measuring the electrical charge conducted through a circuit comprising a variable-capacitance coulometer having a body of non-conductive material with a bore of substantially uniform cross section therethrough, said bore defining two columns of metal each of which extends from an end of the bore toward the other column, an electrolyte disposed between the innermost ends of said columns and maintained in electrical contact with each of said columns, an electrical conductor disposed around the outer surface of said body provided to function cooperatively with both of said columns to form dual differential variable capacitors, means for connecting said columns to an electrical circuit to be metered so that at least some predetermined portion of the circuit current flows through said coulometer, oscillator means for producing a relatively high frequency A.-C. voltage, circuit means for connecting said A.-C. voltage across the columns of said coulometer, and means for measuring the A.-C. voltage developed on said electrical conductor.

4. Apparatus for measuring the electrical charge conducted through a circuit, said apparatus comprising a variable-capacitance coulometer having a body of non-conductive material with a bore of substantially uniform cross section therethrough, said bore defining two columns of metal each of which extends from an end of the bore toward the other column, an electrolyte disposed between the innermost ends of said columns and maintained in electrical contact with each of said columns, an electrically conductive coating surrounding at least a portion of the outer surface of said body to function cooperatively with both of said columns to form dual variable capacitors, means for connecting said columns to an electrical circuit to be metered so that at least some predetermined portion of the circuit current flows through said coulometer, oscillator means for producing a relatively high frequency A.-C. voltage, circuit means for connecting A.-C. voltage across the columns of said coulometer, capacitor means connected to maintain one of said columns at A.-C. ground, and means for measuring the A.-C. voltage developed between said conductive coating and A.-C. ground.

5. Apparatus for measuring the electrical charge conducted through a circuit, said apparatus comprising a variable-capacitance coulometer having a body of non-conductive material with a bore of substantially uniform cross section therethrough, said bore defining two columns of metal each of which extends from an end of the bore toward the other column, an electrolyte disposed between the innermost ends of said columns and maintained in electrical contact with each of said columns, an electrically conductive coating surrounding at least a portion of the outer surface of said body to function cooperatively with both of said columns to form dual variable capacitors, means for connecting said columns to an electrical circuit to be metered so that at least some predetermined portion of the circuit current flows through said coulometer, oscillator means for producing a relatively high frequency A.-C. voltage, circuit means for connecting said A.-C. voltage in push-pull across the columns of said coulometer, circuit means including a phase-sensitive detector for measuring and indicating the amplitude and the phase of the voltage developed on said conductive coating with respect to the phase of said A.-C. voltage.

References Cited by the Examiner

UNITED STATES PATENTS

| 2,054,659 | 9/1936 | Osnos | 317—248 |
| 3,045,178 | 7/1962 | Corrsin | 324—68 |
| 3,096,591 | 7/1963 | Higgins et al. | 324—61 |

OTHER REFERENCES

"A Capacitance Method for Measuring the Thickness of Thin Water Sheets", (Black) U.S. Naval Radiological Defense Laboratory (Research and Development Technical Report USNRDL–TR–315), dated April 3, 1959, pages 2 and 3.

Michels, Electrical Measurements and Their Applications, Van Nostrand, New York, 57, QC535 M 52C, pages 190–191.

WALTER L. CARLSON, *Primary Examiner.*

FREDERICK M. STRADER, *Examiner.*

C. W. HOFFMANN, M. J. LYNCH,
*Assistant Examiners.*